United States Patent
Young et al.

[15] 3,645,336
[45] Feb. 29, 1972

[54] METHOD FOR PLUGGING HIGHLY PERMEABLE ZONES

[72] Inventors: Charles W. Young, 4417 Yale, Metairie, La. 70004; Charles F. Blankenhorn, 631 La Vereda Drive, La Habra, Calif. 90631

[22] Filed: Feb. 24, 1970

[21] Appl. No.: 13,776

[52] U.S. Cl. ............................................166/288, 166/292
[51] Int. Cl. ..................................E21b 33/13, E21b 33/138
[58] Field of Search ..........................166/288, 292, 300, 303; 61/36 R; 260/DIG. 40, DIG. 14

[56] References Cited

UNITED STATES PATENTS

| | | | |
|---|---|---|---|
| 3,074,802 | 1/1963 | Alexander et al. | 260/DIG. 40 |
| 3,121,462 | 2/1964 | Martin et al. | 166/288 |
| 3,202,214 | 8/1965 | McLaughlin | 166/292 |
| 3,259,189 | 7/1966 | Darley | 166/292 |
| 3,285,338 | 11/1966 | Boston | 166/292 X |
| 3,438,443 | 4/1969 | Prats et al. | 166/288 UX |

*Primary Examiner*—Stephen J. Novosad
*Attorney*—George G. Pritzker and J. H. McCarthy

[57] ABSTRACT

Steam, sodium silicate and a gelling agent are mixed adjacent the exposed face of a highly permeable zone and then injected therein. The silica gel plug formed in the zone is hard, glassy and substantially impermeable.

9 Claims, No Drawings

METHOD FOR PLUGGING HIGHLY PERMEABLE ZONES

The necessity for plugging a highly permeable zone has been a long standing problem for which many solutions have been proposed. The growing popularity of thermally stimulating oil bearing formations has introduced the desirability of providing an inexpensive plugging technique for relatively high-temperature wells. In particular, the injection of steam and/or hot water into a formation necessitates the use of a plug which is not adversely affected by hot water.

The use of sodium silicate and a gelling agent to plug formations of moderate temperature is well known as exemplified by U.S. Pat. Nos. 1,421,706; 1,827,238 and 2,025,948. Although there are many known gelling agents which are used with sodium silicate, it is reported in U.S. Pat. No. 3,332,490 that sodium silicate is an ineffective plugging agent since the plug disintegrates in hot water. It will be apparent that the provision of a plugging agent which is not affected by hot water is advantageous for use in wells penetrating a thermally stimulated formation. In particular, a plugging agent meeting these criteria in a well used to inject steam and/or hot water would be most desirable.

A primary objective of the invention is to provide a stable, impermeable silica gel plug in a high-permeability zone.

Another object of the invention is to provide an impermeable sodium silicate plug which is capable of withstanding a high-temperature aqueous environment of the type common in thermally stimulated petroleum bearing formations.

In its broadest aspects, the invention comprises mixing steam, sodium silicate and a gelling agent adjacent the zone to be plugged, injecting the mixture into the zone and reacting the components to produce a relatively impermeable silica gel plug therein.

In accordance with the invention, the exposed face of a highly permeable zone is treated to reduce the permeability thereof by introducing into the zone mixture of steam, sodium silicate and a gelling agent. The mixture is preferably produced adjacent the face of the zone by conducting steam and sodium silicate through one confined path and steam and a gelling agent through another confined path to a location adjacent the exposed zone face and mixing the materials thereat. The high temperature of the mixture accelerates the formation of the silica gel requiring substantially immediate injection of the mixture into the zone. The silica gel formed in the zone is a firm glassy substantially impermeable structure.

The extent of permeability reduction in the zone is related to the amount of the sodium silicate and gelling agent introduced therein as well as the proportion of sodium silicate to the gelling agent. It is thus apparent that the extent of permeability reduction can be controlled to a large extent.

The rate of reaction of sodium silicate and the gelling agent is quite rapid thereby requiring segregation of the separate components until just prior to the injection of the mixed components into the formation. The rate of reaction can be controlled to some extent by varying the ratio of the gelling agent to the sodium silicate.

The sodium silicate employed in the process of this invention may be any type of sodium silicate previously used in similar processes. The sodium silicate used may be a typical commercial aqueous solution. A preferred commercially available sodium silicate solution is known as N-grade and can be purchased from the Philadelphia Quartz Company. The molar ratio of the sodium oxide to the silicon dioxide in the sodium silicate is typically within the range of about 1:3.0 to 1:4.0. For example, the molar ratio of sodium oxide to silicon dioxide may be within the range of 1:3.0 to 1:3.5. For purposes of convenience, the molar ratio of sodium oxide to silicon dioxide is preferably 1:3.22 which is typical of commercially available sodium silicate.

The sodium silicate solution is injected into the steam line by using a tee placed adjacent the wellhead. The container of solution is connected to one leg of the tee with the other legs comprising a steam inlet and a mixture outlet.

The amount of sodium silicate necessary to form a plug of the desired size may be readily calculated from formation parameters. It is normally desirable for the period of injection to be from 1 to 3 hours. The rate of silicate injection into the steam line is thus readily determined.

Many of the known gelling agents for sodium silicate may be used in the practice of the invention. Among the reagents that may be used are aqueous salt solutions or aqueous salt suspensions of the type disclosed in U.S. Pat. No. 1,421,706, carbon dioxide, hydrochloric acid and formamide. Carbon dioxide is preferred over hydrochloric acid since it is substantially less corrosive than hot hydrochloric acid. Carbon dioxide is preferred to the mentioned salt suspensions, salt solutions and formamide because of ease of handling.

Liquid carbon dioxide is preferably obtained commercially in suitable high-pressure containers. Upon injection of liquid carbon dioxide into the steam lines the carbon dioxide flashes from a liquid to a gas. When the rate of silicate injection is known from suitable measurements taken at the wellhead, the rate of carbon dioxide injection into the steam line is adjusted to an approximately stoichiometric ratio.

Any suitable procedure may be employed for separately introducing the stream of sodium silicate and steam and the stream of gelling agent and steam to a location adjacent the face of the exposed high-permeability zone. Assuming that the permeable formation resides at the bottom of a well bore and it is desired to plug the entire zone, a tubing string may be suspended from the surface to a location adjacent the formation top. Steam and the gelling agent are introduced into a common flow line and passed through the tubing string concurrently with the injection of steam and sodium silicate into the annulus.

In the alternative, separate tubing strings may be used to inject the steam-gelling agent stream and the steam-sodium silicates stream. A packer may be positioned in the well at a location just above the formation to be treated. The steam, gelling agent and sodium silicate mix together at the bottom of the tubing string and are substantially immediately injected into the formation.

The mixture of steam, sodium silicate and gelling agent is injected into the formation at the maximum rate the formation will take without fracturing. The ratio of steam/sodium silicate and steam/gelling agent may be adjusted from time to time as the injection rate changes. Low-quality steam, i.e., 60–90 percent steam, may typically be used. In such circumstances, the condensate is normally injected into the bottom of the formation while the steam, sodium silicate and gelling agent are injected in the upper portions of the formation.

Where the zone to be treated is located at the top of a perforated interval in the bottom of a well, sand may be passed through the tubing string to fill the well casing from the bottom to a location immediately below the perforations to be treated. In this manner, the injected materials can be located as desired. Upon completion of the plugging operation, the sand is removed in any suitable manner, as by washing. In the alternative, a packer may be used to seal off undesired injection sites. As a further alternative, the entire formation may be squeeze cemented followed by perforating the desired injection site. After the plugging operation is completed, the remainder of the producing zone may be perforated in a known manner.

Where the formation or zone therein to be treated is located substantially above the bottom of the well, a pair of packers may advantageously be positioned in the well straddle the zone to be treated.

In the typical situation where the bottom of the casing is filled with formation fluids, the injection pressures of both components should be sufficient to avoid displacing the fluids up one of the injection paths in order to insure injection of both component streams into the formation.

The hydrogel or silica gel formed during the practice of the invention sets quite rapidly. It is preferred to seal off the injection zones and retain pressure therein to avoid producing the partially formed silica gel from the formation back into the well bore. Typical shut-in times are from 1 to 3 hours.

Better results are obtained when a quantity of sodium silicate and steam are first passed into the well bore and partially injected in the formation. Carbon dioxide and steam are then passed into the well bore displacing most of the previously injected steam and sodium silicate into the formation. Steam and sodium silicate and steam and carbon dioxide are then passed separately through distinct confined paths into the well bore, mixed adjacent the formation face and then injected into the formation.

Equivalent results are obtained when a quantity of steam and sodium silicate are first passed into the well bore and partially injected into the formation. Injection of carbon dioxide and steam is then commenced and streams of carbon dioxide-steam and sodium silicate-steam are injected simultaneously.

In the laboratory, Philadelphia Quartz Company N-grade sodium silicate was mixed with water to form solutions ranging in concentration from 3 percent N-grade with 97 percent water to 100 percent N-grade sodium silicate. These solutions were mixed into steam which was flowing into sand packs made up of coarse or fine grained sand. A second steam carrying various concentrations of solutions of calcium chloride, sodium carbonate, sodium bicarbonate, or sodium aluminate were carried to mix with the sodium silicate—steam right at the injection force of the sand packs. These tests indicated that both fine and coarse sand packs were consistantly plugged when 20 percent N-brand sodium silicate was used with above salt solutions. The plugs were virtually impermeable to steam and on disassemblying the equipment, the material appeared as a hard silica capping the end of the core.

EXAMPLE 1

The selected test well was completed adjacent the bottom thereof in a thick permeable formation containing high-viscosity oil. The well had been produced in a huff-and-puff steam injection method. The pump, tubing string and sucker rods were moved from the well and the tubing string suspended from the surface to a point adjacent the formation top. An adjustable bean was inserted in the carbon dioxide-steam line to control the flow rate. At the beginning of the test, approximately 20 barrels of N-grade sodium silicate was injected with steam through the annulus without injecting the gelling agent. Then an approximately stoichiometric amount of carbon dioxide was injected along with steam through the tubing without injecting sodium silicate. Thereafter, sodium silicate was passed at a constant rate of about one-third barrel per minute along with steam through the annulus while carbon dioxide and steam was injected concurrently through the tubing. The flow rate through the carbon dioxide-steam line was adjusted to maintain even pressure buildup in the tubing and the annulus. At the end of the treatment, the injection pressure approached the fracturing pressure of the formation. Approximately 47 barrels of sodium silicate were injected during the test. The well was shut in and bailed at a later date. A very hard gel was recovered. When steam injection was begun after treatment, the injection pressure was approximately three times that recorded before the treatment.

EXAMPLE 2

The second test well was a steam injection well completed in a manner similar to the first test well. It was desired to plug an upper part of the producing formation to direct subsequently injected steam into the bottom of the producing interval. Sand was injected through a tubing string suspended from the surface to fill the well casing from the bottom thereof to seal off a substantial part of the perforated interval. Approximately 10 barrels of sodium silicate and 70 percent quality steam were injected down the annulus at 40 p.s.i.g. without injecting carbon dioxide and steam through the tubing. Then approximately 50 barrels of sodium silicate were injected through the annulus with steam while injecting carbon dioxide and steam through the tubing. The rate of sodium silicate injection was held substantially constant at about one-half barrel per minute. When carbon dioxide and steam were injected through the tubing, the injection pressure through the annulus increased to approximately 200 p.s.i.g. The injection pressure through the tubing was regulated to be slightly higher than the injection pressure through the annulus to preclude formation fluids in the well bore from backing up the tubing. The well was shut in for a brief period of time. The sand plug was removed and steam injection was commenced at a substantially higher pressure than prior to the treatment.

It will be seen that an effective process for reducing the permeability of earth formations has been provided. The permeability of a formation adjacent an injection well can be reduced to maximize the effect of injection fluids. Further, the reduction of formation permeability can be used to achieve other desirable ends, for example the control of gas-oil and oil-water ratios.

We claim:

1. A method of plugging a highly permeable zone of an underground oil-bearing formation penetrated by a well prior to recovering oil therefrom comprising the steps of:
   a. passing a mixture of steam and sodium silicate through one confined path into an area of the well adjacent to the highly permeable zone;
   b. concurrently or sequentially passing a mixture of steam and a gelling agent for said silicate through a second confined path into the same area as (a);
   c. injecting mixtures (a) and (b) into the highly permeable zone; and
   d. reacting said mixtures in the highly permeable zone and forming a relative impermeable silica gel plug therein.

2. The method of claim 1 comprising delivering a quantity of sodium silicate and steam into the zone adjacent to the highly permeable zone prior to passing the gelling agent thereto.

3. The method of claim 2 comprising delivering a quantity of gelling agent and steam into the zone adjacent to the highly permeable zone after the first mentioned delivering step and prior to the concurrent passing step.

4. The method of claim 1 wherein the second mentioned passing step is commenced after the delivery of a substantial quantity of sodium silicate and steam into the zone adjacent to the highly permeable zone.

5. The method of plugging a high injectivity zone of an underground hydrocarbon bearing formation penetrated by a well designed for recovery of said hydrocarbon by a hot aqueous fluid drive comprising the step of:
   a. passing a mixture of steam and sodium silicate through one confined path into a zone of the well adjacent to the high-injectivity zone;
   b. passing concurrently or sequentially a mixture of steam and carbon dioxide through another confined path into a zone of the formation adjacent to the high injectivity zone;
   mixing mixtures (a) and (b);
   d. injection the mixture (c) into the high-injectivity zone of the formation; and
   e. reacting the sodium silicate and carbon dioxide in the high-injectivity zone to form a relatively impermeable silica gel plug therein.

6. The method of claim 5 comprising injecting a quantity of steam and sodium silicate in the zone and then injecting a quantity of steam and carbon dioxide therein prior to the passing steps.

7. The method of claim 5 wherein the second mentioned passing step is commenced after the injection of a substantial quantity of sodium silicate and steam into the zone.

8. A method of plugging an exposed highly permeable zone of a hydrocarbon bearing underground formation penetrated by a well comprising the steps of:
   a. injecting while mixing a mixture of steam, sodium silicate and a gelling agent for said silicate into a zone of said well adjacent to the highly permeable zone, the amounts of said silicate and gelling agent being sufficient to form a relatively impermeable silica gel plug of a desired size in said highly permeable zone;

b. injecting mixture (a) into the highly permeable zone; and c. reacting the mixture in the highly permeable zone to form said plug therein.

9. The method of claim 8 wherein the gelling agent for the silicate is essentially carbon dioxide.

* * * * *